March 1, 1960 E. BROMBERG 2,926,907
APPARATUS FOR FOLDING AND HANDLING NEWSPAPERS AND THE LIKE
Filed Jan. 4, 1956 11 Sheets-Sheet 2
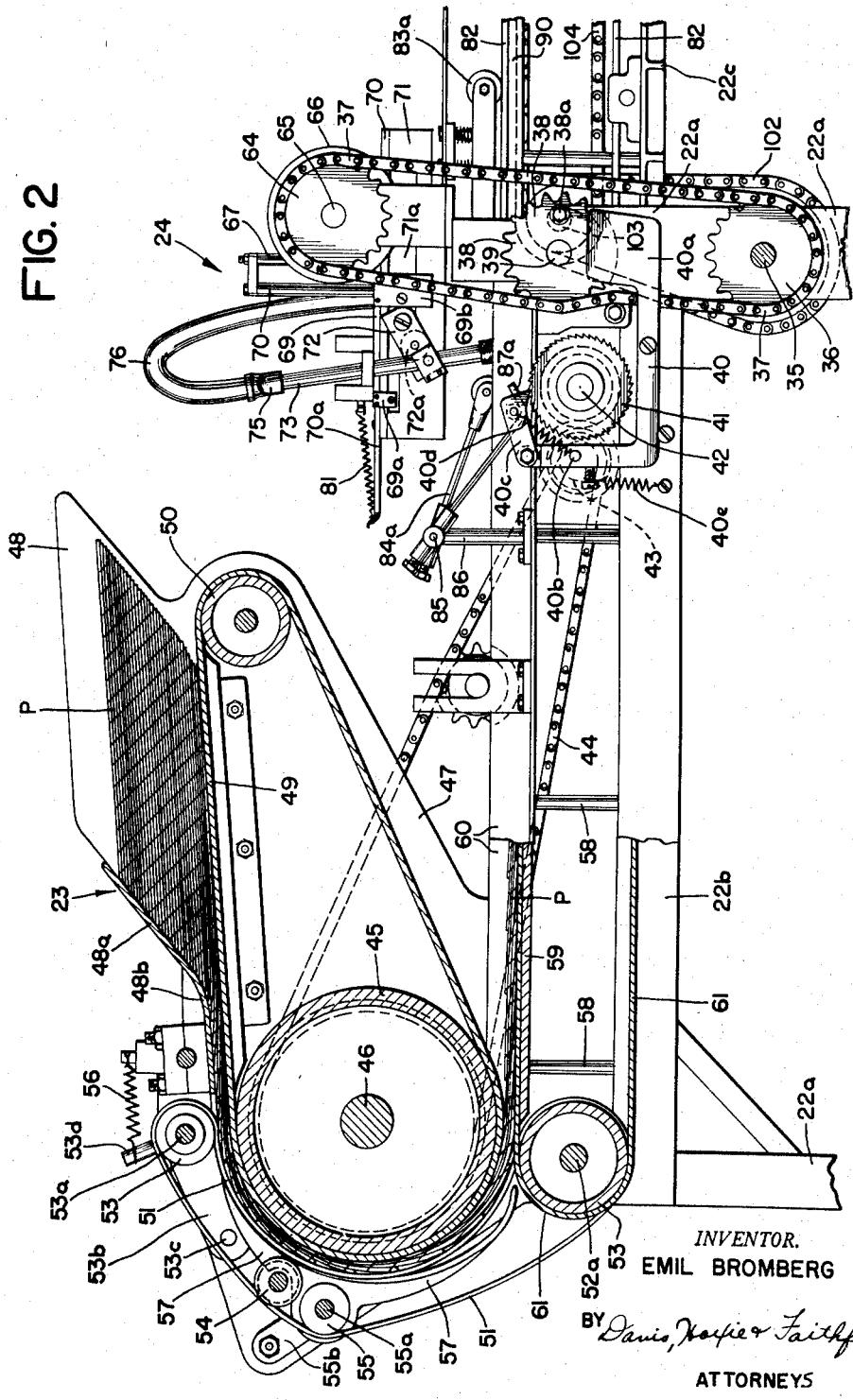
INVENTOR.
EMIL BROMBERG
BY Davis, Hoxie & Faithfull
ATTORNEYS

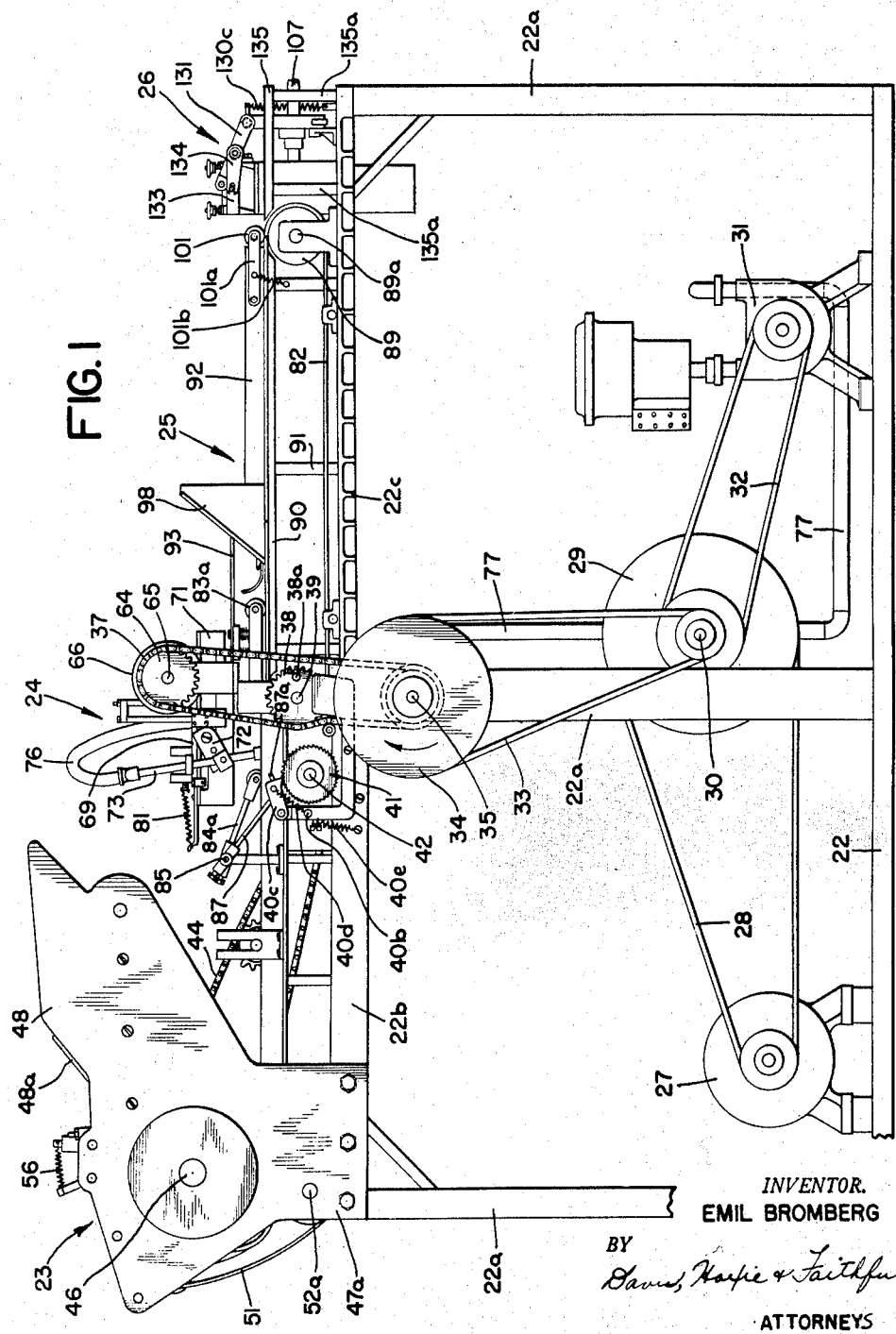

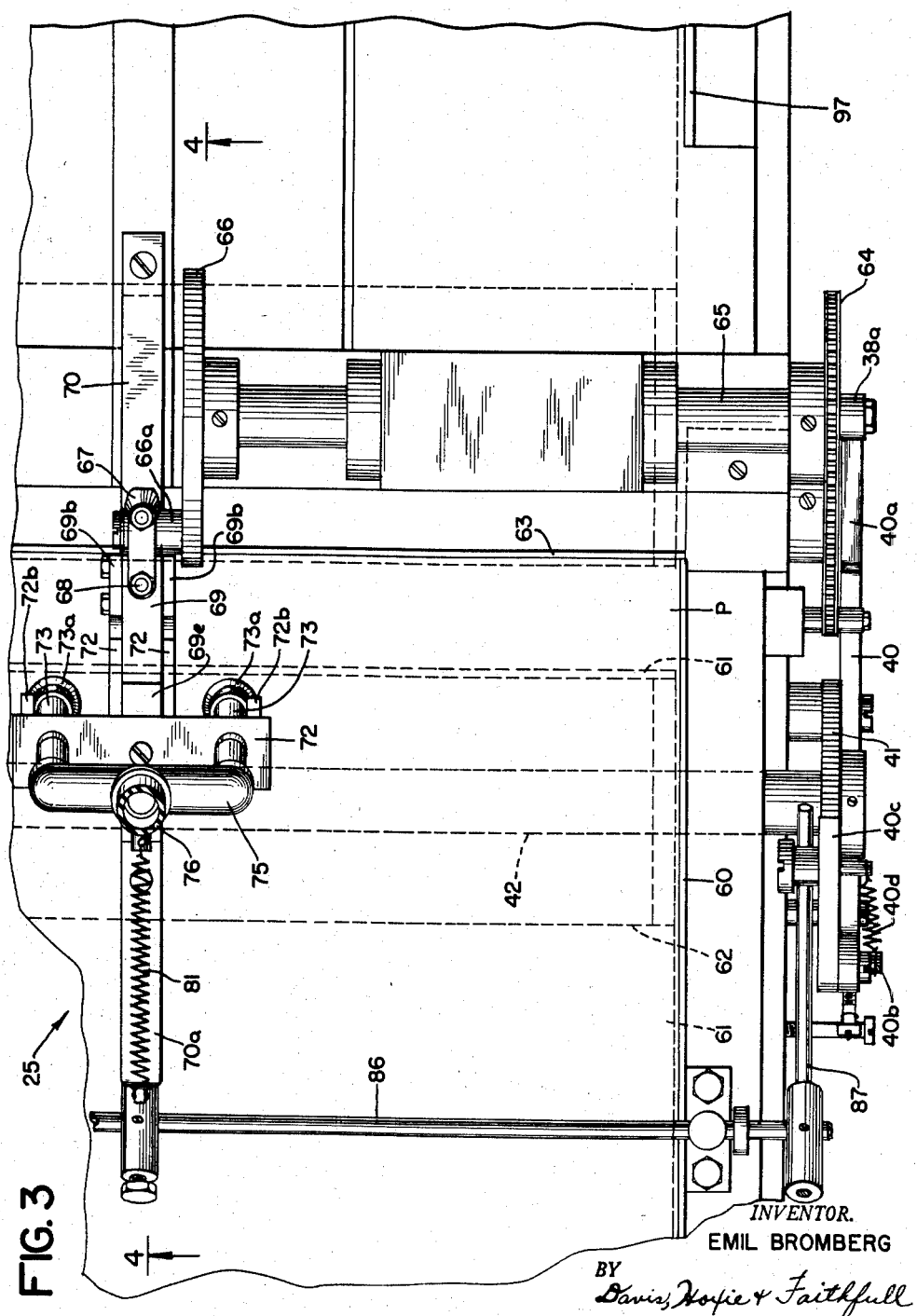

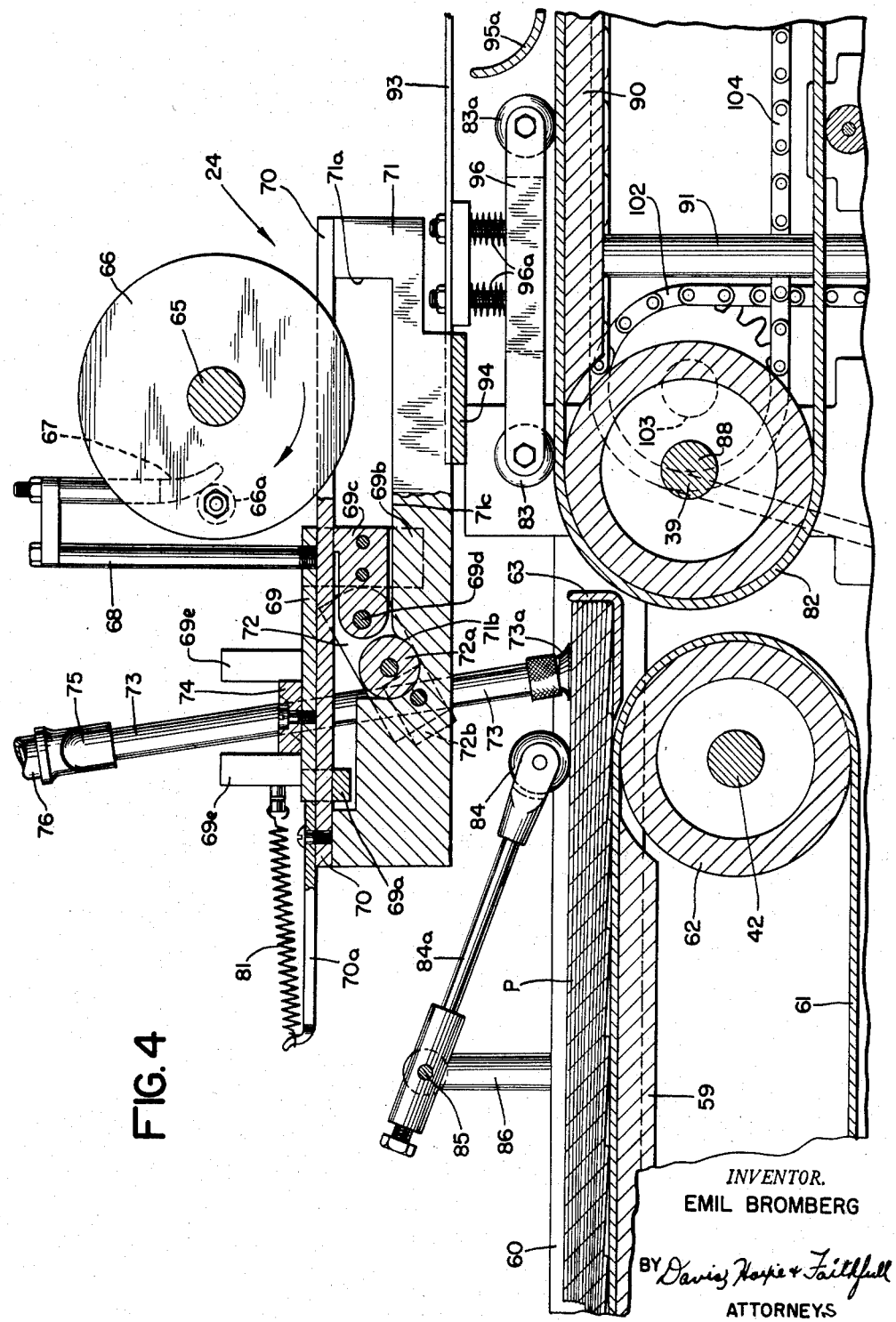

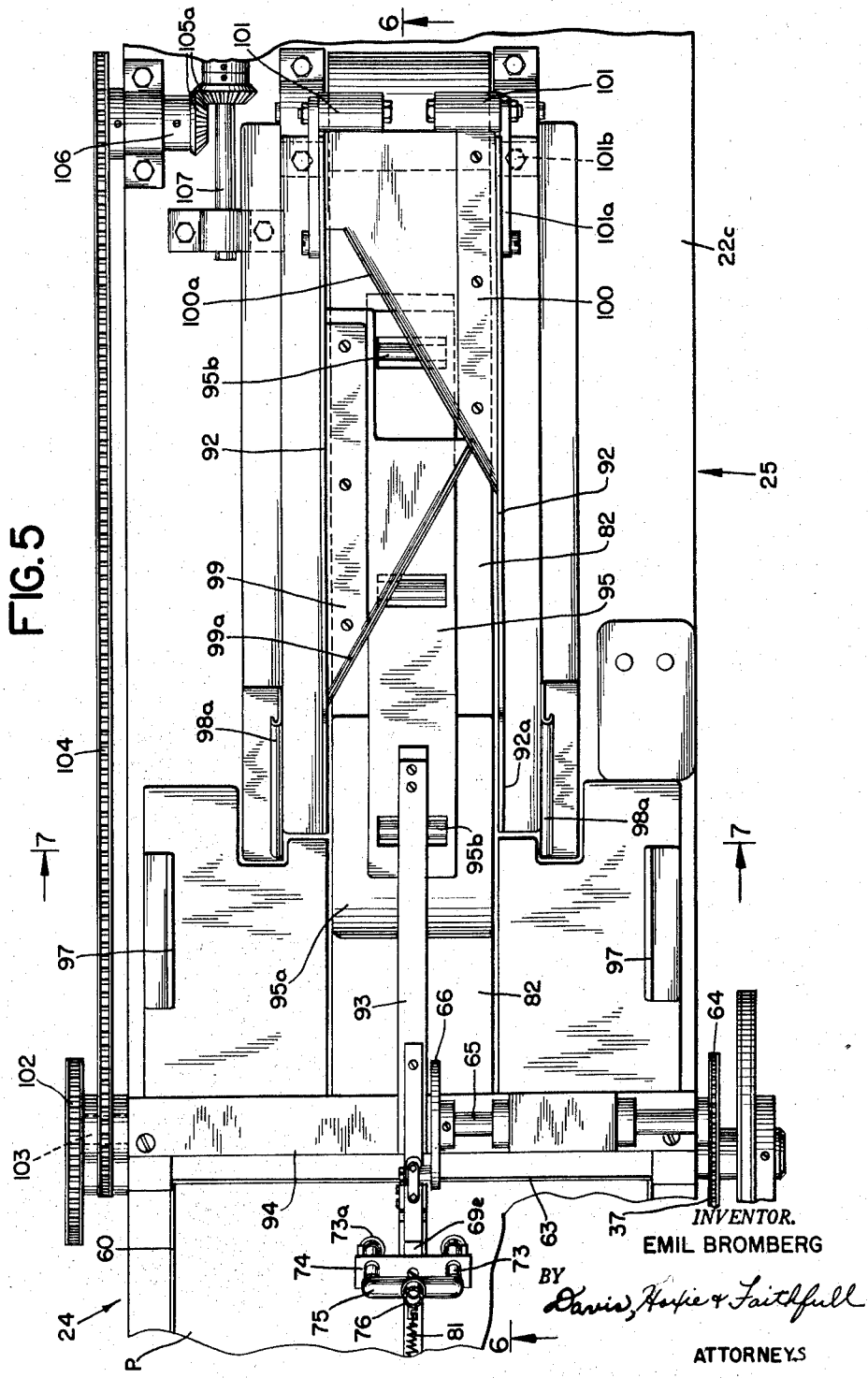

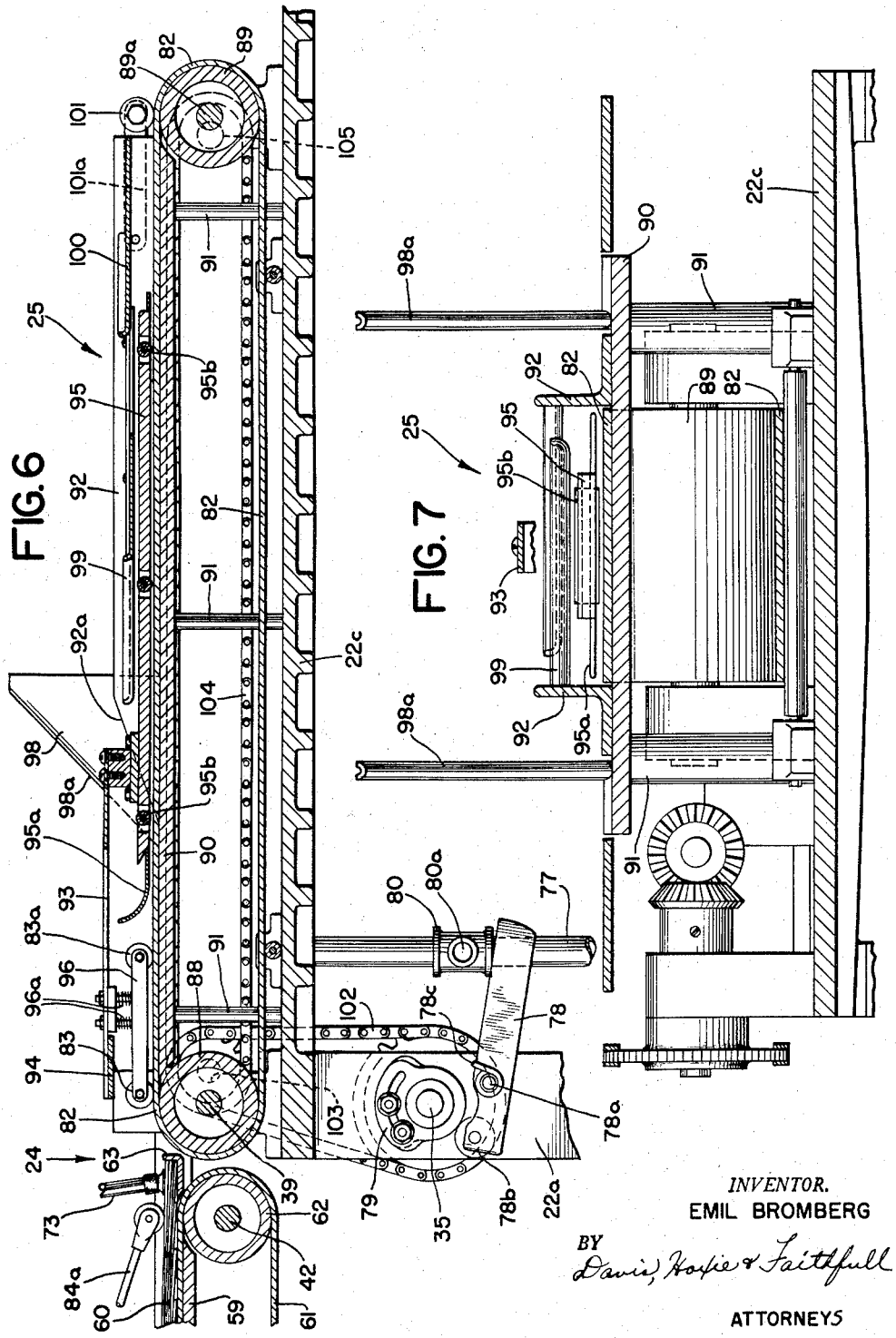

March 1, 1960     E. BROMBERG     2,926,907
APPARATUS FOR FOLDING AND HANDLING NEWSPAPERS AND THE LIKE
Filed Jan. 4, 1956     11 Sheets-Sheet 7

INVENTOR.
EMIL BROMBERG
BY
Davis, Hoxie & Faithfull
ATTORNEYS

March 1, 1960 E. BROMBERG 2,926,907
APPARATUS FOR FOLDING AND HANDLING NEWSPAPERS AND THE LIKE
Filed Jan. 4, 1956 11 Sheets-Sheet 8
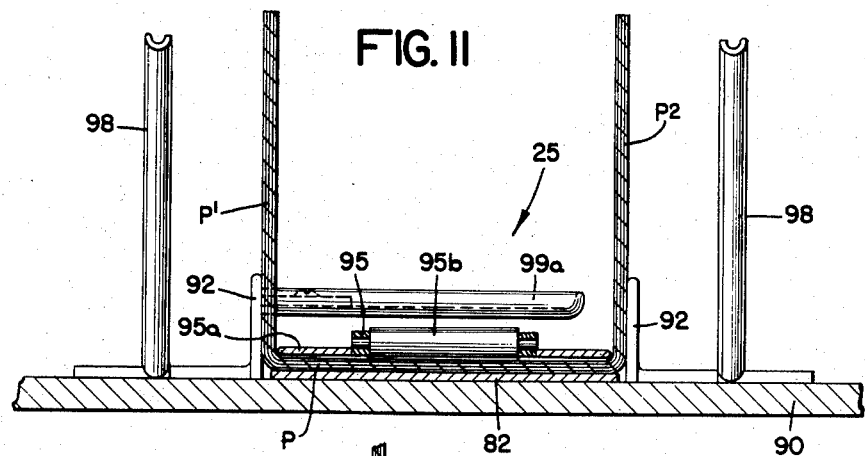
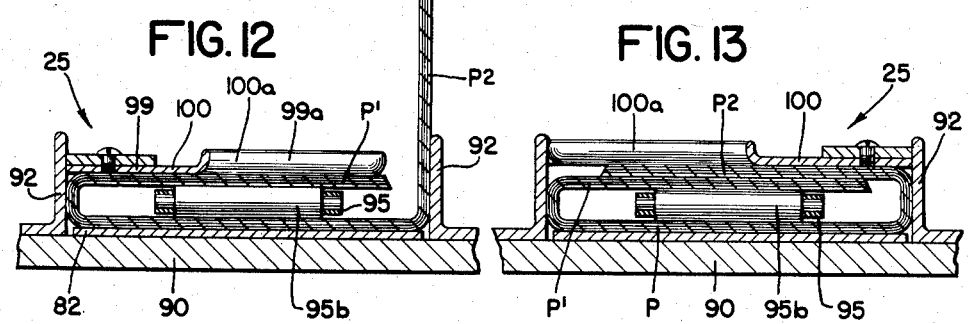
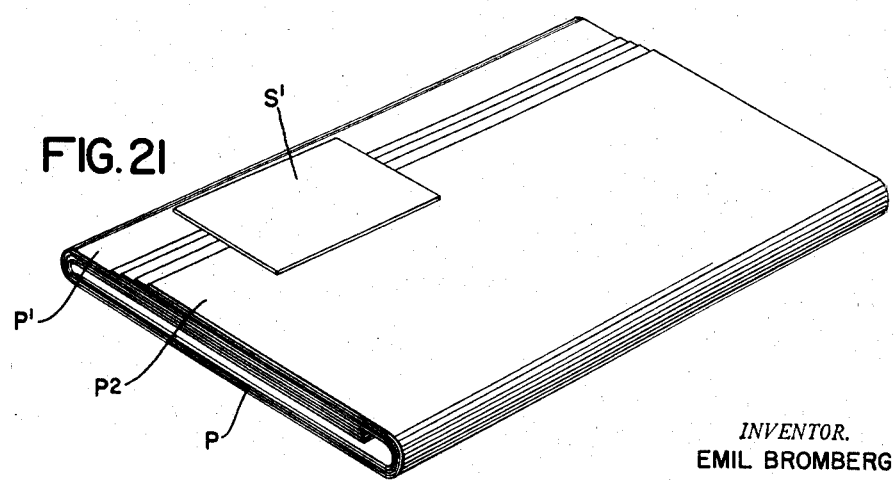
INVENTOR.
EMIL BROMBERG
BY
ATTORNEYS

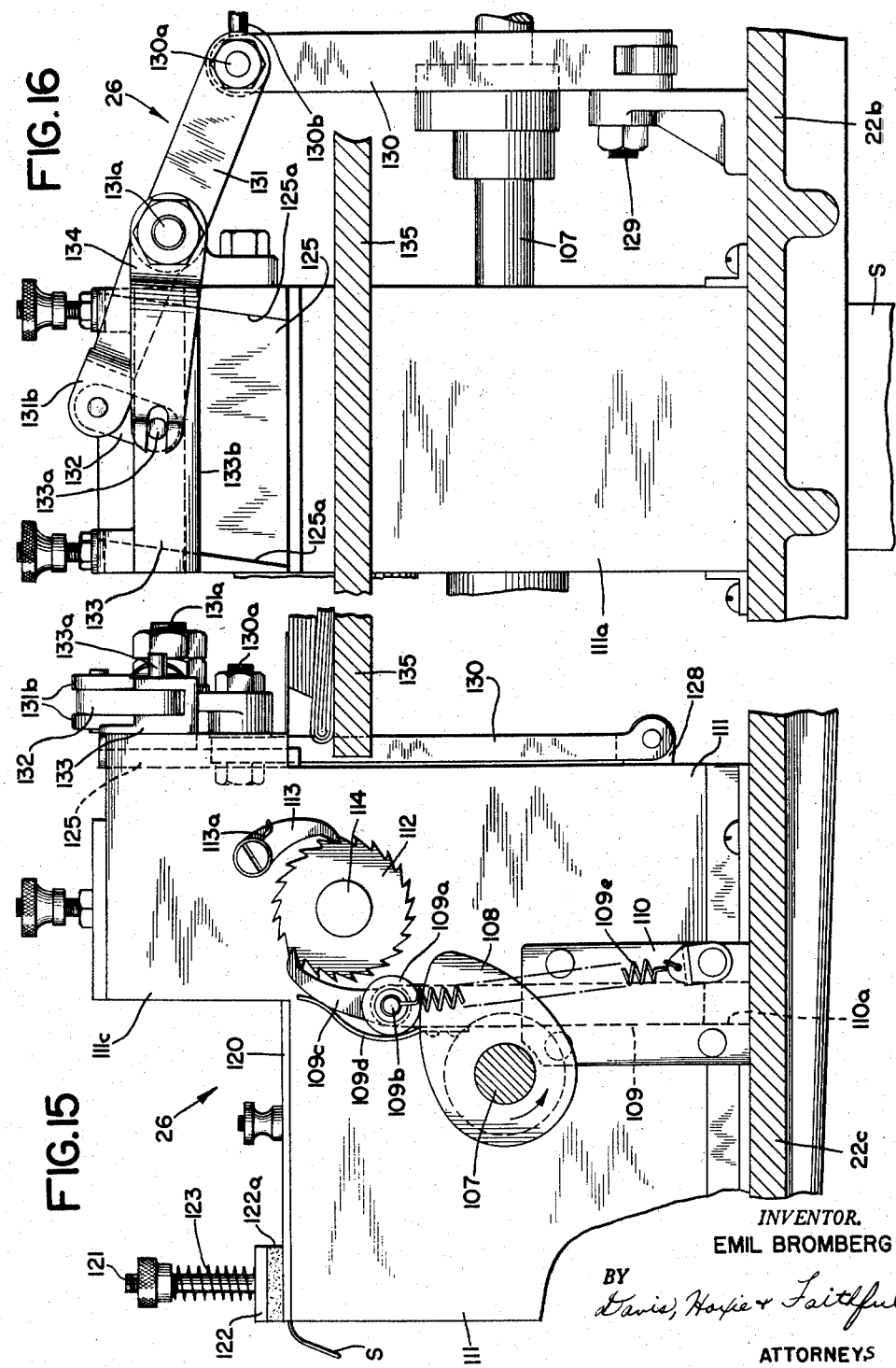

March 1, 1960 E. BROMBERG 2,926,907
APPARATUS FOR FOLDING AND HANDLING NEWSPAPERS AND THE LIKE
Filed Jan. 4, 1956 11 Sheets-Sheet 11
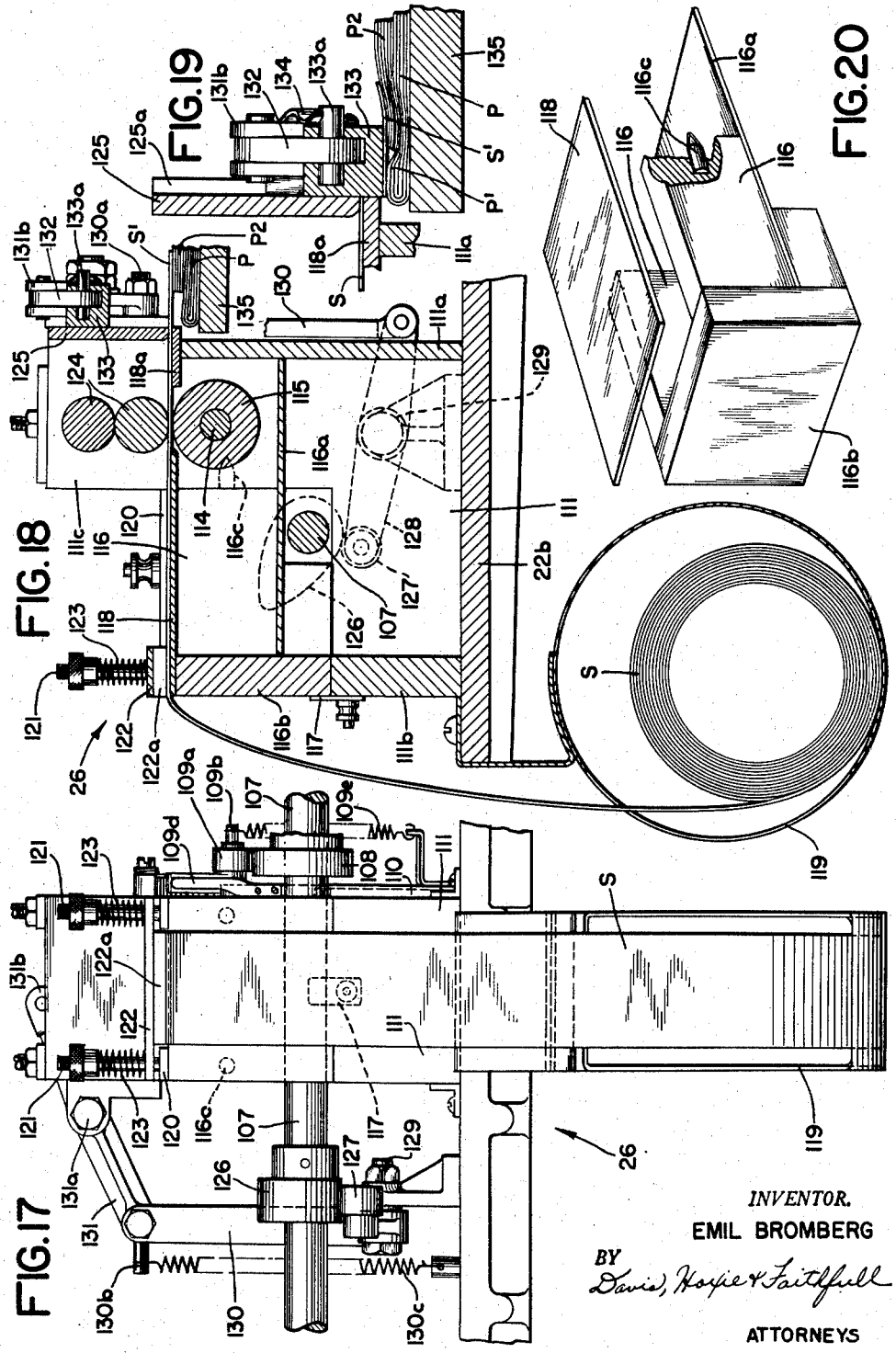
INVENTOR.
EMIL BROMBERG
BY
ATTORNEYS

United States Patent Office 2,926,907
Patented Mar. 1, 1960

2,926,907

APPARATUS FOR FOLDING AND HANDLING NEWSPAPERS AND THE LIKE

Emil Bromberg, Brooklyn, N.Y.

Application January 4, 1956, Serial No. 557,285

3 Claims. (Cl. 271—35)

This invention relates to the folding of papers and similar materials, and has particular reference to an improved apparatus for this purpose. The present application is a continuation-in-part of my copending application Serial No. 171,734 filed July 1, 1950, now U.S. Patent No. 2,759,727.

While the new apparatus may be used for handling papers or other sheet materials in various forms, it may be used to particular advantage for preparing newspapers for mailing. Accordingly, for illustrative purposes the invention will be described in connection with the handling of newspapers, although it will be understood that the invention is not limited to such use.

In preparing newspapers for mailing, the several sheets of each newspaper are assembled in the usual manner and folded first along a central vertical crease and then along a central horizontal crease, so that each newspaper is in the form in which it commonly appears on the newsstand. Then, in order to place each newspaper in a compact form suitable for mailing, the conventional practice is to fold the two lateral portions of the newspaper inward and downward against the central portion, so that one of the lateral portions overlaps the other. The newspaper is held in this folded form in any suitable manner, as by applying a paper band which surrounds the folded newspaper or by pasting a paper strip across the free edge of the outermost fold of the newspaper. Heretofore, these operations for folding the lateral portions of the newspaper and applying the holding device have generally been performed manually, with the result that a substantial labor cost is entailed. Some attempts have been made to devise machines for replacing these manual operations, but so far as I am aware the prior machines have not been acceptable commercially. In general, the machines previously proposed for this purpose are unsatisfactory for various reasons, among which are their complexity, the high cost of making and maintaining them, and their inability to operate continuously over long periods of time without failures, such as clogging of the machinery by the newspapers or damaging the newspapers or improperly folding them.

The principal object of the present invention, therefore, resides in the provision of an improved apparatus for preparing newspapers for mailing.

An apparatus made in accordance with the invention comprises a feed mechanism including a hopper for receiving a stack of newspapers and from which the papers are fed intermittently in sequence to a transfer mechanism. The latter operates intermittently to transfer the newspapers one-by-one from the feed mechanism to a conveyor forming part of a folding mechanism. Each newspaper, as it moves along the conveyor, is engaged at its lateral portions with folder elements which act to turn the lateral portions of the paper away from the plane of the conveyor and into planes at substantially right angles to the conveyor, and then to turn the lateral portions inward into planes substantially parallel to the conveyor, whereby the lateral portions are disposed in overlapping relation against the central portion of the newspaper. Then, each newspaper thus folded is delivered by the conveyor to a strip applicator operating intermittently to press a strip of adhesive paper across the free edge of the uppermost fold of the newspaper, which is then ready for mailing.

The preferred form of the feed mechanism is as follows: The hopper overlies an endless belt driven intermittently to feed the newspapers in sequence from the bottom of the hopper to a drum. The hopper has an end wall sloping downward toward the endless belt in the direction of movement of the papers thereon, so that the papers are fed smoothly from the hopper with the leading edge of each paper lagging somewhat behind the leading edge of the next underlying paper. The endless belt moves the papers around part of the periphery of the drum, and during this movement of the papers they are held against the belt by endless straps which are free to move with the papers and press them against the drum. The papers emerging between the drum and the endless straps are deposited upon a series of endless belts which feed the papers intermittently to a stop. Due to the fact that the papers are inverted in passing around the drum, they are delivered in sequence to the stop in the same relative positions in which they were removed from the hopper but with the leading edge of each paper lagging somewhat behind the leading edge of the next overlying newspaper. Accordingly, the papers tend to become stacked at the stop, and the height of the stack tends to increase as the papers are delivered by the endless belts to the bottom of the stack.

In its preferred form, the transfer mechanism is as follows: One or more suction tubes are mounted on a reciprocable slide and are provided at their lower ends with suction cups engageable with the uppermost newspaper in the stack adjacent the stop. As the slide moves forward, the suction tubes thereon are raised by a cam action so as to lift the upper-most newspaper over the stop and carry it to the conveyor of the folding mechanism. Then the suction in the tubes is broken to release the paper, and the slide returns to its initial position, causing the suction tubes to be lowered into engagement with the next uppermost paper in the stack. After the suction is restored in the tubes, the cycle is repeated. To prevent excessive stacking of the papers at the stop, which would impair the operation of the transfer mechanism, I priovide a feeler device which renders the feed mechanism inoperative when the stack exceeds a predetermined height. When the transfer mechanism reduces the height of the stack sufficiently, the feeler device allows the feed mechanism to resume its operation.

The folding mechanism in its preferred form is as follows: A stationary platen overlies the conveyor and more or less floats on the papers which move one-by-one along the conveyor. The platen and the conveyor are disposed between stationary vertical side members and folding elements having inclined edges along which the lateral portions of each paper ride, so that these lateral portions are turned upward along the sides of the platen. Beyond these vertical folding elements are generally horizontal ones spaced above the platen and having slanting edges which, as each paper continues its movement along the conveyor, turn first one and then the other of the vertical, lateral portions of the paper inward and downward. Thus, these portions are deflected into overlapping relation between the platen and the horizontal folding elements.

The strip applicator in its preferred form comprises means for moistening a strip of paper and feeding it intermittently to a plunger, and means for operating the plunger intermittently to shear a length of the paper strip and press it across the free edge of the uppermost fold of each folded newspaper delivered by the conveyor of the folding mechanism.

For a better understanding of the invention, reference may be had to the accompanying drawings illustrating a preferred form of the new apparatus. In the drawings:

Fig. 1 is a side elevational view of the apparatus;

Fig. 2 is a similar view, partly in vertical section, showing the hopper and intermediate feed mechanism and also the transfer mechanism;

Fig. 3 is a plan view of the transfer mechanism;

Fig. 4 is a sectional view of the transfer mechanism, taken on the line 4—4 in Fig. 3;

Fig. 5 is a plan view of the transfer mechanism and also the folding mechanism;

Fig. 6 is a vertical sectional view of the transfer and folding mechanisms, taken on the line 6—6 in Fig. 5;

Fig. 7 is a cross-sectional view of the folding mechanism, taken on the line 7—7 in Fig. 5;

Fig. 11 is a cross-sectional view of the folding mechanism, showing the first step in the folding operation;

Figs. 12 and 13 are cross-sectional views of other parts of the folding mechanism, showing, respectively, the steps of folding down first one side and then the other side of the paper;

Figure 14:
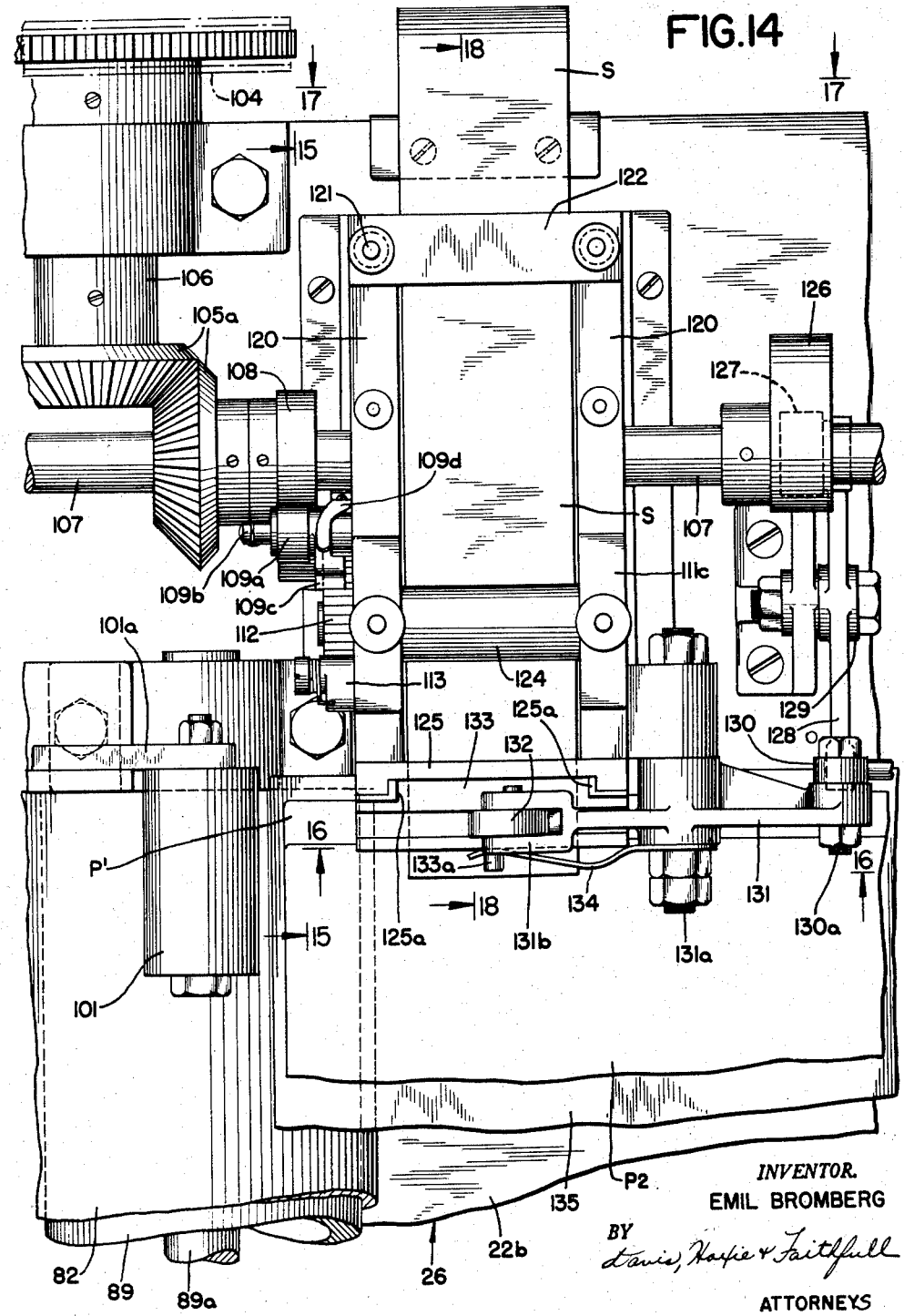
Fig. 14 is a plan view of the strip applicator which acts upon the newspaper after the folding operations.

Figs. 15, 16, 17 and 18 are sectional views of the strip applicator, taken on the lines 15—15, 16—16, 17—17 and 18—18, respectively, in Fig. 14.

Fig. 19 is a detailed sectional view of part of the strip applicator, illustrating the action of the plunger for shearing the strip and pressing it upon the folded newspaper.

Fig. 20 is a perspective view of the liquid container forming part of the strip applicator, and Fig. 21 is a perspective view of a newspaper after completion of the various operations performed by the apparatus.

Referring to the drawings, the apparatus comprises a base 22 (Fig. 1) resting upon the floor and supporting by means of legs 22a a horizontal frame 22b—22c. The latter, in turn, supports the main operating parts of the apparatus. These parts, in the order in which they operate upon the newspapers, are the hopper and intermittent feed mechanism 23, the transfer mechanism 24, the folding mechanism 25 and the strip applicator 26. Briefly, the mechanism 23 receives the newspapers in a hopper, in which they are stacked, and feeds them intermittently from the bottom of the stack to the transfer mechanism 24. The latter operates intermittently to convey the newspapers one-by-one from the feed mechanism to the folding mechanism 25, through which each newspaper is moved continuously to effect the series of folding operations in sequence. From the folding mechanism 25, the folded newspapers are delivered one-by-one to the strip applicator 26, which operates to cut a strip from a roll of paper, apply a liquid to the strip, and press the strip across the free edge of the folded newspaper so as to prevent it from becoming accidentally unfolded.

The apparatus is driven by a motor 27 mounted on the base 22 and connected through a belt 28 to a pulley 29 on a transverse shaft 30. A suction pump 31 mounted on the base is driven from shaft 30 through a belt 32. Another belt 33 connects the drive shaft 30 to a pulley 34 mounted on a transverse shaft 35 just below the horizontal frame 22b—22c and about mid-way between the frame ends.

Hopper and intermittent feed mechanism

The driven shaft 35 carries a sprocket 36 operating through a chain 37 to drive a sprocket 38 on a transverse shaft 39. The sprocket wheel 38 has an eccentric pin 38a which, once in each revolution of this wheel, engages the underlying end 40a of a rocker arm 40 pivoted to the frame at 40b. Pivoted to the free end of the arm is a pawl 40c which is urged by a spring 40d against the teeth of a ratchet wheel 41 mounted on a transverse shaft 4. A second spring 40e urges the arm counterclockwise, as viewed in Fig. 2, against a suitable stop (not shown). Thus, in each revolution of the sprocket wheel 38, its pin 38a depresses the underlying end 40a of the arm and rocks the arm in one direction (clockwise in Figs. 1 and 2), thereby causing the pawl 40c to advance shaft 42 clockwise (Fig. 2) through the angle represented by one tooth on the ratchet wheel 41. As the sprocket pin 38a moves upward in its revolution, the arm 40 is returned by spring 40e against its stop, so that the pawl 40c is retracted and engages the next tooth of wheel 41 in preparation for the next oscillation of rocker arm 40. The inertia of the parts (to be described presently) connected to the shaft 42 prevents the latter from turning counterclockwise (Fig. 2) upon retraction of the pawl 40c.

The intermittently rotating shaft 42 is geared at the rear of the apparatus to an adjacent transverse shaft 43 (Fig. 2) which operates through a chain 44 to drive a drum 45 on a transverse shaft 46. The shaft 46, located at the left end of the apparatus as viewed in Figs. 1 and 2, is journalled between longitudinal plates 47 bolted to the sides of the frame 22b. At their upper portions, the plates 47 form the sides of a hopper 48 for receiving a stack of newspapers P. Each newspaper P generally consists of several superimposed sheets folded along a central vertical crease and then folded again along a central transverse crease, in the same manner as they appear on newsstands, the sides of the newspaper being adjacent and parallel to the opposed sides of the hopper. The bottom of the hopper is formed by an endless belt 49 extending around the drum 45 and also around a smaller drum 50 journalled between the side plates 47 at the end of the hopper opposite the drum 45. The hopper also has an end plate 48a extending downwardly toward the larger drum 45 and terminating in a generally horizontal portion 48b spaced above the belt 49 and forming therewith a throat or outlet for the newspapers at the bottom of the hopper. The stack of newspapers P is inserted in the hopper through its open top or through the open end of the hopper opposite the end plate 48a. While I have shown the end wall 48a slanted somewhat (Fig. 2), it can be arranged vertically. Since the drum 45 is driven intermittently, the papers in the hopper gradually descend along the wall 48a against which they are retained. In this way, the newspapers are guided evenly toward and through the exit throat from the bottom of the hopper in the intermittent movements of belt 49. The horizontal plate section 48b is spaced a sufficient distance above the belt 49 to allow several newspapers to pass simultaneously through the exit throat in overlapping relation.

After the newspapers emerge from beneath the horizontal throat plate 48b, they are carried by the belt 49 around the outer portion of the drum 45. In this movement of the newspapers, they are held against the belt 49 by endless straps 51 spaced transversely along the drum 45. Each strap 51 at its lower portion extends around a drum or roller 52 mounted on a transverse shaft 52a below the large drum 45; and at its upper portion each strap 51 extends around a roller 53 on a transverse shaft 53a adjacent the outlet end of the horizontal throat plate 48b. The shaft 53a is mounted on and between longitudinal arms 53b, each of which is pivoted at 53c on one of the side plates 47. Additional rollers 54 and 55 are mounted within the loops of the straps 51 and serve to guide the latter. A spring 56 is connected at one end to a pin 53d on one of the arms 53b and is anchored at its opposite end, so that the spring urges the roller or rollers 53 downward toward the underlying newspapers on belt 49. The spring 56 draws the inner sections of the loops of straps 51 against the newspapers so as to hold the latter against belt 49 as it moves around the drum 45. The guide rollers 55 are mounted on a transverse shaft 55a journalled on arms 55b pivotally secured to the side plates 47. By moving the arms 55b on their pivots, the normal tension in the straps 51 may be adjusted, it being understood that the arms 55b are suitably clamped in position to maintain the desired tension. Guide forks 57 are mounted on the adjustable shaft 55a between the guide rollers 55 and serve to prevent excessive bulging of the newspapers between the endless straps. The forks 57 are adapted to swing on the shaft 55a so as to adjust themselves to the general contour of the newspapers passing around the drum 45.

The horizontal frame 22b has posts 58 supporting a horizontal plate 59 which extends longitudinally between side walls 60. The plate 59 is located within the loops formed by endless belts 61 extending around the drum 52 in the spaces between the endless straps 51. The upper sections of the endless belts 61 rest upon the plate 59, which extends from the drum 52 to a similar drum 62 mounted on shaft 42 (Figs. 4 and 6), the belts 61 also extending around the latter drum. When the newspapers P arrive at the space between the large drum 45 and the underlying drum 52, they are engaged by the endless belts 61 and carried by these belts to a stop 63 above and somewhat beyond drum 62.

If desired, the shaft 52a may be provided with a separate freely rotating pulley for each endless strap 51, the pulleys being located in transversely spaced annular recesses in the periphery of drum 52, and the parts of the drum between these recesses being in engagement with the transversely spaced endless belts 61. The upper roller 53 for the guide straps 51 may be a single drum or it may consist of a series of freely rotatable pulleys spaced transversely along shaft 53a.

The intermittently actuated belt 49 moves the newspapers from the bottom of hopper 48 to the arcuate space between the large drum 45 and the guide straps 51. The latter are free to move around the upper shaft 53a and the lower shaft 52a while guided by the intermediate rollers 54 and 55, and the straps 51 are so moved by frictional contact between their loops and the outer surfaces of the newspapers on the opposing portion of belt 49. By extending the lower portions of the strap loops 51 around a single drum 52 which also engages the endless belts 61, the straps 51 will also be driven positively by drum 52, since the latter is driven through belts 61 and drum 62 from the intermittently rotated shaft 42. In any case, the drum 45, the upper endless belt 49 and the lower endless belts 61 are driven intermittently and in synchronism from the intermittently rotating shaft 42, and they are driven in such directions as to advance the newspapers step-by-step from the hopper 48 partly around the drum 45 and then along the horizontal plate 59 between the side walls 60 to the stop 63.

Each intermittent movement of the upper belt 49 moves one newspaper from the end wall 48a into the exit throat between the horizontal plate portion 48b and the underlying belt 49, the distance of each belt movement being a small fraction of the longitudinal dimension of the newspaper as viewed in Fig. 2. Accordingly, as the newpapers progress through the hopper outlet under the plate section 48b, the leading edge of each newspaper P will lag somewhat behind the leading edge of the next lower newspaper which it overlaps, the amount of the lag being approximately the distance through which belt 49 is driven in each intermittent motion. The newspapers are maintained in approximately these relative positions as they are transported to the stop 63, although the papers are inverted in their passage around the large drum 45. Thus, as the newspapers on belts 61 approach the stop 63 they will be in the relative positions illustrated in Figs. 2 and 4, from which it can be seen that the leading edge of each paper lags somewhat behind the leading edge of the paper next above it on the belts 61. Therefore, if the papers are not removed from the belts 61 after engaging stop 63, the papers will become stacked against the stop, and the stack will be gradually increased in height by the succeeding papers delivered to the bottom of the stack on belts 61. However, the transfer mechanism 24, which will now be described, removes the newspapers one-by-one from the top of the stack above drum 62 and thereby prevents the stack from building up over the level of the stop 63.

*Transfer mechanism*

The chain 37 driving the sprocket wheel 38 extends around an upper sprocket wheel 64 on a transverse shaft 65, so that the chain also drives shaft 65. A disc 66 (Figs. 3 and 4) mounted on shaft 65 has an eccentric pin 66a which, once in each revolution of shaft 65, engages a follower 67 on a post 68 projecting from a slide 69. The slide is movable longitudinally on a track 70, on which it is held at one end by a member 69a extending downwardly on both sides of the track and also beneath the track, and at its opposite end by members 69b depending from the slide on both sides of the track. The track is mounted on a stationary base member 71 which is recessed to form a space 71a directly below the track and intermediate its ends. A block 69c is secured to the slide between the side members 69b and is movable longitudinally with the slide in the space 71a. Arms 72 are pivoted on a pin 69d at opposite sides of the block 69c and extend along the sides of the base member 71. A roller or follower 72a is mounted between the arms 72 and is normally seated in a depression 71b in the lower surface 71c of the recess 71a. At their free ends, the pivoted arms 72 are secured by means of blocks 72b to suction tubes 73. The latter extend upwardly from the blocks 72b through a transverse guide plate 74 secured to the top of slide 69, the tubes extending through the plate 74 with a sliding fit which permits limited tilting of the tubes relative to the slide. The transverse plate 74 is mounted on the slide between blocks or posts 69e.

The suction tubes 73 are provided at their lower ends with rubber suction cups 73a overlying the newspapers P stacked against the stop 63 (Fig. 4). At their upper ends, the suction tubes 73 communicate through a head 75 with a flexible hose 76 leading to a vacuum pipeline 77 which is connected to the suction side of the pump 31. The suction in the tubes 73 is broken intermittently by venting the pipe 77 to atmosphere, as by means of the valve mechanism illustrated in Fig. 6. As there shown, a lever 78 is pivotally mounted at 78a to one of the legs 22a and is provided at one end with a roller or follower 78b held by a spring 78c against the periphery of a cam 79 on shaft 35. At its free end, the lever 78 underlies and supports a valve 80 slidable vertically on the pipe 77 and having an air port 80a adapted to register with a similar port in the pipe 77. In each revolution of the shaft 35, the cam 79 actuates lever 78 against spring 78c so as to raise the valve 80 and vent the vacuum pipe line to atmosphere, thereby breaking the vacuum in the tubes 73. When the raised portion of cam 79 disengages the follower 78b, the valve 80 returns by gravity to its lower position to cut off the admission of air to the vacuum line 77 and thereby reestablish the suction in the tubes 73.

The slide 69 for the suction tubes 73 is urged to the left, as viewed in Figs. 1, 2, 3 and 4, by a spring 81 connected between one of the posts 69e and a projection 70a on the track 70.

In the operation of the transfer mechanism, engagement of the eccentric pin 66a with the follower 67 causes the slide 69 to move forward (to the right in Figs. 1–4) by rotation of disc 66. At the beginning of this forward movement, the parts are in the positions illustrated in Fig. 4, with the suction cups 73a engaging the uppermost newspaper P adjacent the stop 63, and the follower 72a resting in the depression 71b. As the slide moves forward, the follower 72a moves upwardly along the inclined portion of the depression 71b leading to the horizontal bottom 71c of the space 71a, thereby raising the free ends of arms 72 on their pivots 69d. As a result, the suction tubes 73 mounted on the free ends of these arms are also raised and lift the uppermost newspaper above the level of stop 63, since the uppermost newspaper is held against the cups 73a by suction (the valve 80 being closed at this time). As the slide 69 continues its forward movement under the action of the eccentric pin 66A, the uppermost newspaper is carried over the stop 63 to an endless conveyor belt 82 forming part of the newspaper folding mechanism to be described presently. When the slide 69 reaches the end of its forward movement, the newspaper held by the suction cups 73a overlies the belt 82 with the leading edge of the paper disposed in the nip between belt 82 and an overlying roller 83, so that the paper is gripped between the roller 83 and the belt 82. At this moment, the valve 80 is raised to break the vacuum in suction tubes 73 and release the newspaper from the suction cups 73a, whereby the newspaper is drawn away from the transfer mechanism 24 by the belt 82. Then the eccentric pin 66a disengages the follower 67 and allows the spring 81 to retract the slide, this retraction occurring simultaneously with closing of the vacuum release valve 80. As the slide 69 is retracted, the suction cups 73 are moved rearward over the stop 63 and finally drop into engagement with the top of the next newspaper when the roller 72a returns to its recess 71b. The cups 73a then grip the newspaper P now uppermost in the stack adjacent the stop 73, and the cycle is repeated.

It will be understood that the slide 69 is driven in synchronism with the feed mechanism 23 and is returned to its initial position (Fig. 4) only after the lagging edge of the preceding newspaper has been drawn beyond stop 63 by the belt 82. Since the transfer mechanism 24 operates once for each intermittent movement of the feed mechanism 23, the transfer mechanism normally prevents the newspapers from stacking above the level of the stop 63. However, in case the newspapers should for any reason be delivered to the stop 63 at a greater rate than they are removed by the transfer mechanism 24, as by accidental failure of the suction cups 73a to grip the papers, I provide a control mechanism to limit the stacking of the papers against stop 63. This control mechanism, as illustrated, comprises a roller 84 carried by the free end of an arm 84a and resting upon the top of the newspapers stacked against stop 63. The arm 84a extends from a transverse shaft 85 rotatably mounted on posts 86 on the side members 60. A second arm 87 projects from the shaft 86 and has its free end 87a underlying the free end portion of pawl 40c. Thus, when the stack of newspapers retained by the stop 63 exceeds the desired height, the roller 84 is raised sufficiently to disengage the pawl 40c from ratchet wheel 41, by rotating shaft 85 and thereby elevating the free end of arm 87. Thereupon, the drum 45 and the feed belts 49 and 61 are disconnected from their drive shaft 42 and further feeding of the papers is prevented until the transfer mechanism 24 has removed one or more papers from the stop 63 to the conveyor belt 82 of the folding mechanism. When the height of the stack of papers retained by stop 63 has decreased sufficiently, the lowering of roller 84 allows spring 40d to return the pawl 40c into engagement with the ratchet wheel 41, and the operation of the feed mechanism 23 is resumed.

*Folding mechanism*

The folding mechanism includes the endless conveyor belt 82 previously mentioned. The belt 82 extends around a drum 88 mounted on the continuously rotating shaft 39 (Fig. 4) and also around a drum 89 mounted on a transverse shaft 89a near the right end of the horizontal frame 22c, as viewed in Figs. 1 and 6. Within the loop formed by the conveyor belt 82 is a horizontal plate 90 mounted on posts 91 supported by frame section 22c. The plate 90 engages the inner surface of the upper section of the loop formed by belt 82 and extends longitudinally from the drum 88 to the drum 89. The width of the conveyor belt 82 is considerably less than the width of the newspapers P in the form in which they are stacked in the hopper 48 and delivered to the stop 63. As shown particularly in Fig. 5, the width of belt 82 is approximately ⅓ the distance between the side walls 60 which guide and center the newspapers on the feed belts 61. The upper section of the conveyor belt 82 extends between side walls 92 mounted on the horizontal plate 90. The side walls 92 extend longitudinally from the region of the drum 89 but terminate considerably short of the drum 88 in sloping surfaces 92a.

An arm 93 of spring metal extends longitudinally over the conveyor belt 82 and is secured at one end to a transverse member 94 fixed to the horizontal frame section 22c. At its free end, the arm 93 carries a longitudinal platen 95 centered over the upper section of conveyor belt 82. The platen 95 is considerably narrower than the belt 82 and is provided at the end nearest the drum 88 with a guide 95a curving upwardly in the direction of the transfer mechanism 24. The guide 95a is of approximately the same width as the belt 82, that is, slightly narrower than the spacing between side walls 92. It extends longitudinally from the region where the side walls 92 commence to slope downward, as shown at 92a, to a region beyond the adjacent end of platen 95. The platen is also provided with transverse rollers 95b journaled in longitudinally spaced recesses in the platen. The rollers 95b are adapted to rest and roll upon the upper surface of a newspaper P moving along the conveyor belt 82. Thus, the platen 95 more or less floats on the belt 82 but is held by the arm 93 against longitudinal or transverse movement. The weight of the platen causes its rollers 95b to exert considerable pressure on an underlying newspaper P on the belt 82, so that the newspaper is held firmly in frictional contact with the belt.

The nip roller 83, previously mentioned, is mounted between longitudinal members 96 supported from the platen arm 93. At their ends remote from the nip roller 83, the longitudinal members 96 support a similar roller 83a. The rollers 83 and 83a are urged against the upper section of belt 82 (or a newspaper P thereon) by compression springs 96a acting against the longitudinal members 96. The roller 83a is located slightly in advance of the upwardly curved end of the guide 95a and acts to hold the newspaper P flat against the conveyor belt 82 so that the paper will move smoothly under the guide 95a and the platen 95. If desired, side members 97 (Fig. 5) may be provided between the transverse member 94 and the side members 92, in order to guide and center each newspaper when it is delivered to the belt 82 by the transfer mechanism 24, it being understood that the side members 97 are spaced approximately the same distance as the side members 60 so as to accommodate the full width of the newspaper.

Vertical folding plates 98 are mounted on the horizontal plate 90 near the slanting portions 92a of side members 92. The folding plates 98 extend parallel to the side members 92, but the spacing between the plates 98 is somewhat greater than the spacing between the side members 92, as shown in Figs. 5 and 7. Each vertical folding member 98 has an inclined edge 98a which slopes upwardly in the direction of movement of the upper section of belt 82. Since the distance between the members 98 is considerably less than the width of the papers P when they are transferred to the belt 82, the inclined edges 98a are adapted to engage the leading edge of each newspaper moving along the belt 82 and cause the lateral portions of the paper to turn upward by movement of the paper between the members 98. This upward turning of the lateral portions of the paper is also effected in the same manner by the inclined surfaces 92a of the side members 92.

A down-folding member 99 extends inwardly from one of the side walls 92 toward other wall and is spaced slightly above the platen 95. The down-folding member 99 is located somewhat beyond the working edges 98a of the vertical folding members 98, reckoned in the direction of movement of the newspaper on the conveyor belt 82. A horizontal working edge 99a of the member 99 slants toward the platen 95 in the direction of movement of the upper section of belt 82, that is, forward or to the right as viewed in Fig. 5, the end of the slanting edge 99a terminating somewhat short of the opposing wall 92. A second down-folding member 100 extends inwardly from the side wall 92 opposite the free end of the slanting edge 99a and likewise overlies the platen 95 in spaced relation thereto. The member 100 has a working edge 100a which slants toward the platen 95 in the direction of movement of the upper section of belt 82, the slanting edge 100a terminating somewhat short of the opposing wall 92. The main portion of the slanting edge 100a is located somewhat beyond the slanting edge 99a, reckoned in the direction of movement of the newspaper on the conveyor belt.

In the operation of the folding mechanism 25, each newspaper P delivered to the conveyor belt 82 by the transfer mechanism 24 is moved by belt 82 under the guide 95a and the forward end of platen 95. As the newspaper moves along the belt 82, the lateral portions of the paper are engaged by the upwardly slanting edges 98a of the side members 92, with the result that the lateral portions of the paper slide upward along these slanting edges and are thereby turned upwardly around the lateral edges of guide 95a, as shown at $P^1$ and $P^2$ in Figs. 8 and 11. During this upward turning of the lateral portions of the paper, the central portion of the paper is held flat between the belt 82 and the guide 95a, the side edges of the latter serving to determine the positions of the longitudinal folds along which the sides of the newspaper are turned upward. It will be observed from Fig. 11 that each upwardly extending lateral portion $P^1$—$P^2$ of the paper is held vertically between the adjacent side wall 92 and the adjacent lateral edge of guide 95a.

Figure 9:
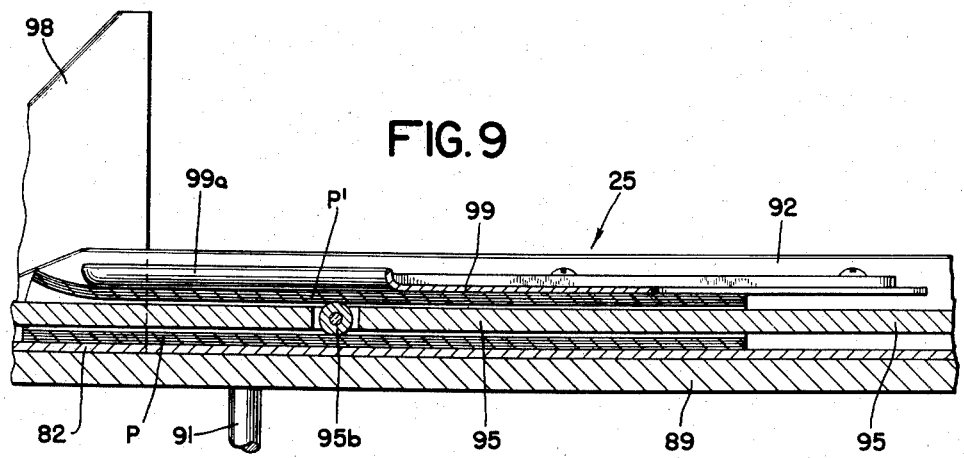
Figs. 9 and 10 are views similar to Fig. 8 but showing, respectively, the parts of the folding mechanism which subsequently act upon the newspaper to fold down first one side and then the other side of the paper.

Further movement of each paper P along the belt 82 brings the upwardly turned lateral portion $P^1$ into engagement with the first down-folding member 99, the slanting edge 99a of which deflects the portion $P^1$ inward and downward between the member 99 and the platen 95. That is, the leading edge of the vertical paper portion $P^1$ first engages the slanting edge 99a at its outer end near the adjacent side wall 92, and as the paper continues its forward movement the portion $P^1$, starting at its lower part, is turned inward by the edge 99a and carried under the member 99, this action progressing inwardly along the edge 99a so that the inner end portion of the latter finally engages and turns down the free edge (the top as shown in Fig. 11) of the paper portion $P^1$. Consequently, the paper portion $P^1$ will be deflected and flattened to a position between the platen 95 and the overlying member 99, as shown in Figs. 9 and 12, whereby it overlaps the central portion of the paper but is separated therefrom by the platen 95.

Figure 10:
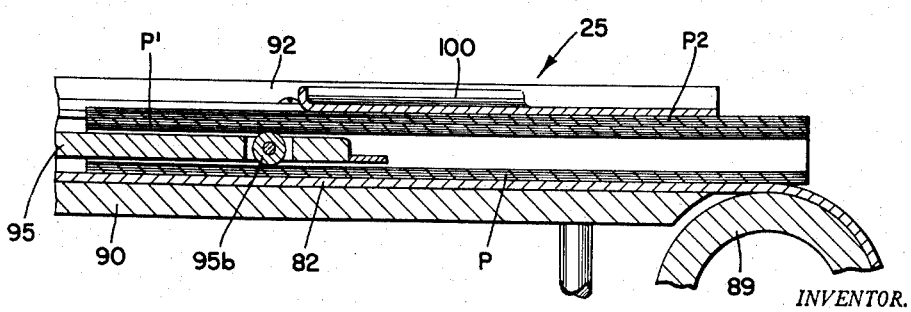

Upon completion of this first down-folding operation, or just prior thereto, the other upwardly turned lateral portion $P^2$ of the newspaper is moved by belt 82 into engagement with the second down-folding member 100, the slanting edge 100a of which deflects the portion $P^2$ inward and downward over the portion $P^1$. The action of the member 100 on the paper portion $P^2$ is similar to the previously described action of member 99 on portion $P^1$. Thus, the paper portion $P^2$ will be deflected and flattened to a position between the underlying portion $P^1$ and the overlying member 100, as shown in Figs. 10 and 13. Since the thickness of the overlapping paper portions $P^1$ and $P^2$ is double the thickness of the initially down-folded portion $P^1$, the second down-folding member 100 is spaced a greater distance above the platen 95 than is the first down-folding member 99, to accommodate the added thickness.

From the second down-folding member 100, the belt 82 moves each newspaper P, in the folded form illustrated in Figs. 10 and 13, to end rollers 101 overlying the belt and the drum 89. The rollers 101 extend transversely from the free ends of arms 101a pivoted on the side members 92, and each roller is urged downward toward the underlying belt 82 by a spring 101b. As the folded newspaper passes under the rollers 101, the pressure of the latter acts to crease the paper along the two longitudinal folds adjacent the portions $P^1$ and $P^2$, so that the newspaper tends to remain in its folded condition. From the rollers 101, the folded newspapers P are delivered one-by-one to the strip applicator 26, which will now be described.

Strip applicator

The strip applicator 26 is driven from shaft 35 through a chain 102 which, at the rear of the machine, connects the latter shaft with a transverse shaft 103 (Fig. 5). Shaft 103 is connected through a chain drive 104 to a transverse stub shaft 105 (Fig. 6) mounted in a bearing 106 on the horizontal frame 22c. The shaft 105 is connected through bevel gears 105a to a longitudinal shaft 107 mounted in suitable bearings on the frame 22c. Thus, the shaft 107 is driven continuously from shaft 35 through the chains 102—104 and the bevel gears 105a.

The longitudinal shaft 107 has a cam 108 (Figs. 14, 15 and 17) which operates a slide 109. The slide 109 is movable vertically in groove 110a in a guide 110 secured against one of the side walls of a casing 111, the slide being confined between the guide and the casing wall 111. At its upper end, the slide 109 carries a roller or follower 109a, as by means of a pin 109b, the follower overlying the cam 108. A pawl 109c extends upward from the pin 109b and is urged by a spring 109d against the teeth of a ratchet wheel 112. Once in each revolution of the shaft 107, the raised portion of cam 108 engages the follower 109a and raises the slide 109 and its pawl 109c, thereby rotating the ratchet wheel 112 through the angle represented by several of its teeth. When the cam 108 disengages the follower 109a, the slide 109 is lowered to its initial position by a spring 109e connected to the pin 109b, whereby the pawl 109c is retracted and engages another tooth of ratchet wheel 112 is preparation for the next actuation of the slide by cam 108. A detent 113 is pressed by a spring 113a against the periphery of the ratchet wheel 112, so as to prevent the latter from rotating when the pawl 109c is retracted. Thus, the ratchet wheel 112 is rotated through the angle subtended by several of its teeth (clockwise in Fig. 15) during each revolution of the cam shaft 107.

The ratchet wheel 112 is mounted on a longitudinal shaft 114 extending between the side walls 111 of the casing. Within the casing, the shaft 114 carries a feed roller 115 (Fig. 18), which is made of an absorbent material. The roller 115 overlies a horizontal partition 116a forming the bottom of a removable sub-casing having side walls 116. In the normal position of the sub-casing 116, its bottom 116a engages an end wall 111a of the main casing. The bottom 116a is connected to a front wall 116b of the sub-casing, which normally rests upon the top of an end wall 111b of the main casing. The side walls 116 of the sub-casing fit against the vertical surfaces of upward extensions 111c of the side walls 111. Locating pins 116c on the sub-casing walls 116 are adapted to be received in recesses in the extensions 111c of the side walls of the main casing. A latch 117 serves to hold the sub-casing 116 in its normal position on the main casing 111. The receptacle formed by the sub-casing 116 contains water or other liquid which is to be applied to a strip of paper S by the roller 115. When it is desired to replenish the liquid supply, the latch 117 is turned to disengage the front wall 116b of the sub-casing, and the latter is removed from the main casing 111 so as to enable a suitable frangible receptacle (not shown), containing the new supply of liquid, to be inserted on the horizontal partition 116a. The sub-casing 116 is then returned to its initial position where it is locked by the latch 117. This return movement of the sub-casing serves to break the frangible receptacle by contact with the roller 115, whereby the latter is immersed in a reservoir of the liquid.

A horizontal plate 118 rests upon the top of the sub-casing 116 and extends from the end wall 116b to the feed roller and liquid applicator 115. A strip of paper S is fed along the top of plate 118 from a supply roll held in a magazine 119 depending from the frame 22b. The paper strip S extends upwardly from the magazine 119 and over one end of plate 118, on which it is guided between side members 120. Posts 121 project upwardly from the casing 111 and through the end portions of a member 122 extending across and above the strip S. The member 122 carries a piece of rubber, or the like, 122a which is pressed by springs 123 against the upper surface of the paper strip S as it passes over the plate 118. Above the absorbent roll 115 are idler rollers 124 mounted between the extensions 111c of the side walls of the casing. The rollers 124 are pressed downward in any suitable manner so as to grip the paper strip between the roller 115 and the lower of the two rollers 124.

Each revolution of the cam shaft 107 causes the rotation of ratchet wheel 112 and roller 115 through part of a revolution of shaft 114, so that the roller 115 draws a length of the paper strip S along the plate 118 from the magazine 119. At the same time, the roller 115 applies liquid from the sub-casing 116 to the bottom of the length of paper S passing between the rollers 115 and 124, whereby the bottom of the strip becomes adhesive. It will be understood that the strip S may be provided initially with an adhesive coating, in which case the liquid applied by roller 115 may be water. Alternatively, the liquid applied by the roller 115 may be a paste or other adhesive, in case the strip S is not initially coated with an adhesive. The spring-pressed member 122 effects a drag on the strip S as it is advanced by the roller 115, thereby preventing any slack in the strip as it approaches the liquid applicator 115 and the cutting and pressing device, which will now be described.

Beyond the feed roller 115, reckoned in the direction of movement of the paper strip S, is a horizontal plate 118a which, with the plate 118, defines an opening for engagement of the roller 115 with the bottom of the strip S. The plate 118a is mounted on top of the end wall 111a of casing 111 and underlies a vertical guide plate 125 mounted between the side extensions 111c of the casing. The bottom of guide plate 125 is spaced slightly above the plate 118a so as to form a horizontal slit through which the strip S is advanced intermittently by roller 115.

At the side of casing 111 opposite the cam 108, the longitudinal shaft 107 has a second cam 126 which overlies and engages a roller or follower 127 on one end of an arm 128. The arm 128 is pivotally mounted intermediate its ends, as shown at 129. At its end opposite the follower 127, the arm 128 is pivotally connected to a vertical link 130 which extends upward to one end of a lever 131 mounted intermediate its ends on a pivot 131a. The upper end of the link 130 is connected to the adjacent end of lever 131 by a pivot 130a. A pin 130b projects from the upper end of link 130 and is connected to one end of a spring 130c which is anchored at its opposite end. The spring 130c acts to draw the link 130 downward and thereby hold the follower 127 against the periphery of cam 126.

The end of lever 131 opposite the link 130 is provided with a yoke 131b pivotally connected to a depending link 132. At its lower end, the link 132 is connected to a plunger 133 by means of a pivot pin 133a. The plunger 133 is movable vertically between guides 125a on the outer face of guide plate 125. As shown particularly in Fig. 16, the guides 125 are generally vertical but are slightly inclined so as to give the plunger 133 a longitudinal movement as it moves downward between the guides. A leaf spring 134 is mounted at one end on the pivot 131a, and its free end engages the plunger 133 around the pivot pin 133a so as to hold the plunger firmly against the vertical plate 125 and between its guides 125a.

A horizontal plate 135 is mounted on posts 135a above the horizontal frame 22c and extends longitudinally from the drum 89 at the level of the upper section of belt 82 (Fig. 1). One side of the horizontal plate 135 underlies the plunger 133, as shown particularly in Figs. 15, 18 and 19.

In the operation of the strip applicator 26, each folded newspaper P is delivered from the belt 82 and the pressure roller 101 to the horizontal plate 135, with the free edge of the uppermost fold or lateral portion $P^2$ underlying the plunger 133. The plunger 133 is then moved downward by the raised portion of cam 126, operating through arm 128, link 130 and lever 131, so as to shear a length of paper $S^1$ from the underlying strip S, as shown in Figs. 18 and 19. In this downward movement of the plunger, it is also moved longitudinally (that is, transversely of the strip S) by reason of the inclination of guides 125a, whereby shearing of the paper strip $S^1$ from the main strip is facilitated. The plunger 133 is moved downward below the level of the plate 118a so as to press the sheared strip $S^1$ across the free edge of the lateral portion $P^2$ of the underlying newspaper. Thus, the strip $S^1$ will adhere to the newspaper in position to hold it in its folded condition, it being understood that the previous application of the liquid to the strip by the roller 115 makes the strip adhesive so that it will stick to the newspaper P. When the strip $S^1$ has been applied to the newspaper, as described, the newspaper is ready for mailing, as shown in Fig. 21. The address of the subscriber may be printed on the strip $S^1$ before or after the latter is applied to the newspaper, or it may be printed on any other suitable part of the newspaper.

After the plunger 133 has sheared the strip $S^1$ and pressed it upon the underlying newspaper P, the plunger is lifted to the position illustrated in Fig. 16 by the action of spring 130c, due to disengagement of the raised portion of cam 126 from the follower 127. Then, the next folded newspaper on belt 82 is delivered to the horizontal plate 135 and displaces the newspaper to which the strip $S^1$ was previously applied, the displaced newspaper falling into a suitable receptacle (not shown) or being removed in any other suitable manner. Approximately simultaneously with this delivery of the next newspaper to the plate 135, the roller 115 is again rotated from cam 108 through a fraction of a revolution and thereby advances another length of the strip S through the narrow slit between the plates 118a and 125, so that the projecting length $S^1$ of the strip is in position to overlie the free edge of the lateral portion P² of the next newspaper, as shown in Figs. 18 and 19. Then, the plunger 133 is again lowered through the action of cam 126, whereby its working surface 133b shears the projecting strip S¹ and presses it upon the underlying newspaper as previously described. These actions of the feed roller 115 and the plunger 133 are repeated each time a folded newspaper P is delivered to the plate 135 from belt 82.

*General operation*

Figure 8:
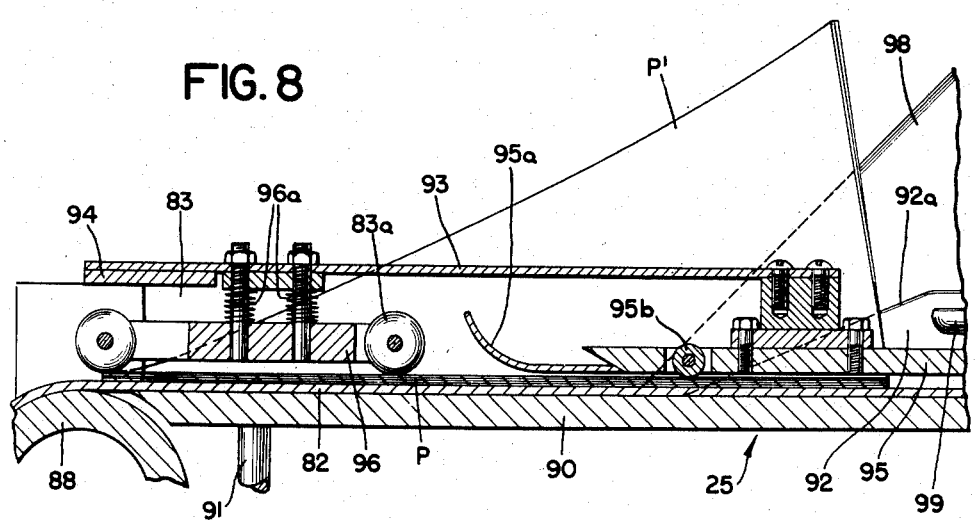
Fig. 8 is a vertical sectional view showing the part of the folding mechanism which first acts upon the newspaper.

The newspapers P stacked in the hopper 48 are moved therefrom in sequence by the intermittently operating feed mechanism including the endless belt 49, the endless straps 51 and the belts 61. The belts 61 move the newspapers to the stop 63, which represents a station adjacent the conveyor 82. The transfer mechanism 24, adjacent the feed mechanism 23 and the conveyor 82, includes the suction tube 73 and its slide 69, which form a device operable intermittently to transfer the papers P one-by-one from the feed mechanism to the conveyor 82. Then, the lateral portions P¹ and P² of each newspaper moving along the conveyor 82 engage the slanting surfaces 98a and 92a, which constitute vertical folder elements mounted in the path of the newspapers, whereby the lateral portions P¹ and P² are turned upward as shown in Figs. 8 and 11. Thereafter, the folder elements 99 and 100 act successively on the upwardly extending lateral portions P¹ and P², respectively, to turn them inward and downward in overlapping relation against the top of platen 95, as shown in Figs. 12 and 13. The platen 95 serves to hold the central portion of the paper P flat against the conveyor 82 while the lateral portions P¹ and P² are being acted upon by the folder elements, 92a, 98a, 99 and 100. The folded newspapers are then delivered one-by-one to the strip applicator 26, which operates as previously described to moisten and shear a paper strip S¹ and press it across the upper edge of the uppermost fold P² of each newspaper.

It will be apparent that the new apparatus operates to fold the newspapers in a form suitable for mailing and to seal them in this form, the handling of the newspapers being entirely automatic except for stacking them in a hopper 48. The apparatus may be operated at high speed so as to handle the entire output of a newspaper printing plant of substantial size.

I have found that the guide forks 57 and the spring 56 can be omitted, as the apparatus operates in a highly satisfactory manner without them. Also, while I have shown the transfer mechanism having the arm roller 84 resting upon the top of the newspapers stacked against stop 63 (Fig. 4) it will be understood that the arm 84a may be arranged to extend in the opposite direction from that shown in Fig. 4. That is, the arm 84a may be swung around the transverse shaft 85 so that the roller 84 rests upon the top of the newspapers which are approaching the stop 63. In this case, of course, the arm 87 must be replaced by a suitable connection between shaft 85 and the free end portion of pawl 40c so that the latter is raised by rotation of shaft 85, in response to raising of the roller 84 when the stack of papers beneath this roller increase to a predetermined height. In other words, with this alternate positioning of arm 84a, excessive stacking of the papers below the arm roller 84 will turn shaft 85 clockwise (Fig. 2) sufficiently to disengage the pawl 40c from ratchet wheel 41, so that the drum 45 and the feed belts 49 and 61 are disconnected from their drive shaft 42, whereby further feeding of the papers is prevented until the transfer mechanism 24 has removed one or more papers to allow lowering of the arm wheel 84.

I claim:
1. Apparatus of the character described comprising a hopper for receiving a stack of papers, an endless feed belt forming the bottom of the hopper, a feed drum, the belt extending partly around the drum, an endless strap extending partly around the drum opposite said belt and engageable with papers thereon to hold the papers against the belt and the drum, means mounting the endless strap for movement independently of said feed drum and endless feed belt, whereby the strap partakes freely of the movement of the papers with which the strap engages, and a conveyor below the drum for receiving papers emerging between the belt and said strap, said mounting means for the endless strap including a guide member biased toward the drum and movable bodily toward and away from the drum to accommodate different thicknesses of paper between the strap and drum, the strap extending partly around said guide member, the hopper having a generally horizontal part overlying the feed belt and forming therewith an exit throat leading from the lower portion of the hopper, said guide member being located adjacent said exit throat.

2. Apparatus according to claim 1, in which said guide member is a roller.

3. Apparatus according to claim 1, comprising also means for driving said drum and conveyor intermittently in synchronism.

References Cited in the file of this patent

UNITED STATES PATENTS

| | | |
|---|---|---|
| 651,307 | Harris | June 5, 1900 |
| 834,631 | McCann | Oct. 30, 1906 |
| 1,058,314 | Lynch | Apr. 8, 1913 |
| 1,412,404 | Hardic | Apr. 11, 1922 |
| 1,635,197 | Tufts | July 12, 1927 |
| 1,760,119 | Cross et al. | May 27, 1930 |
| 2,203,531 | King | June 4, 1940 |
| 2,234,017 | Bauer | Mar. 4, 1941 |
| 2,281,089 | Novick | Apr. 28, 1942 |
| 2,339,835 | Burckhardt | Jan. 25, 1944 |